United States Patent [19]
Tajima

[11] Patent Number: 5,191,630
[45] Date of Patent: Mar. 2, 1993

[54] NONLINEAR OPTICAL DEVICE FOR CONTROLLING A SIGNAL LIGHT BY A CONTROL LIGHT

[75] Inventor: Kazuhito Tajima, Tokyo, Japan
[73] Assignee: NEC Corporation, Tokyo, Japan
[21] Appl. No.: 688,391
[22] Filed: Apr. 22, 1991

[30] Foreign Application Priority Data

Apr. 20, 1990 [JP] Japan .................................. 2-104943
Feb. 19, 1991 [JP] Japan .................................. 3-24228

[51] Int. Cl.$^5$ ..................... G02F 1/28; G02F 1/015; G02B 6/10
[52] U.S. Cl. ..................... 385/122; 385/5; 359/328; 359/326
[58] Field of Search ............... 350/96.12, 96.13, 96.14, 350/96.15, 96.29, 355, 356, 384–386; 307/425–430; 359/326–332; 385/1–3, 14, 122, 131

[56] References Cited

U.S. PATENT DOCUMENTS

| | | | |
|---|---|---|---|
| 3,746,879 | 7/1973 | Esaki et al. | 359/328 |
| 4,775,215 | 10/1988 | Teng et al. | 350/96.34 |
| 4,863,245 | 9/1989 | Roxlo | 350/356 |
| 4,999,485 | 3/1991 | Capasso et al. | 350/386 X |
| 5,005,933 | 4/1991 | Shimuzu | 350/96.14 |

FOREIGN PATENT DOCUMENTS 0254509 1/1988 European Pat. Off. .
0275554 7/1988 European Pat. Off. .

*Primary Examiner*—Akm E. Ullah
*Attorney, Agent, or Firm*—Sughrue, Mion, Zinn, Macpeak & Seas

[57] ABSTRACT

A nonlinear optical device for controlling a signal light by a control light comprises a waveguide region consisting of an optical nonlinear semiconductor material, and an electrostatic field generator, which is a DC supply for example. Carriers (electrons and holes) generated by excitation of electrons due to a control light having a predetermined wavelength supplied to the waveguide region are swept away from the waveguide region by an electrostatic field, so that the change of nonlinear refractive index of the waveguide region can follow the change of the control light to increase the operation speed of the nonlinear optical device.

7 Claims, 3 Drawing Sheets

NONLINEAR OPTICAL DEVICE FOR CONTROLLING A SIGNAL LIGHT BY A CONTROL LIGHT

FIELD OF THE INVENTION

This invention relates to a nonlinear optical device for controlling a signal light by a control light, and more particularly to, a nonlinear optical device for controlling a signal light by a control light used in a high speed optical communication system or an optical signal processing system.

BACKGROUND OF THE INVENTION

In optical information processing systems or optical communication systems, the control of optical signals such as optical modulation for carrying signals on light or optical arithmetic operation are carried out.

In a conventional optical system, the control of optical signals is carried out by an electric control signal, in which a semiconductor laser as a light source is modulated directly by controlling a bias current of the semiconductor laser. In other case, the refractive index or the optical absorption coefficient of a semiconductor material or a dielectric material which composes a waveguide is changed by applying a voltage.

In the optical system controlled by an electric control signal, the operation speed of the optical system is limited by two factors, one of which is the operation speed of electrically operating devices which compose the optical system, and the other is mismatching of speeds between the electric control signal and a signal light to be controlled, so that it is very difficult to increase the operation speed of the optical system, or it is difficult to shorten the operation time shorter than the order of nano seconds.

Recently, an optical system controlled by a control light (opto-optic control system) has been developed. In the optical system controlled by a control light, there is no limitation in operation speed due to the non-existence of CR time constant, so that the operation speed is expected to increase considerably.

One type of an optical device for an optical system controlled by a control light is a nonlinear optical device which comprises a waveguide consisting of an optical nonlinear semiconductor material having a property of a nonlinear refractive index.

In operation, a signal light to be controlled is supplied to the waveguide of the nonlinear optical device. The signal light passes through the waveguide without any modulation when a control light is not supplied to the waveguide. When the control light having a predetermined wavelength is supplied to the waveguide, electrons in the valence band in the semiconductor composing the waveguide are excited into the conduction band to change the refractive index of the waveguide (band filling effects). As a result, a phase shift of the signal light occurs.

Therefore, the operation characteristic of the nonlinear optical device largely depends on the optical nonlinearity (the nonlinear index of refraction) of the semiconductor composing the waveguide. The optical nonlinearity is represented by the third order nonlinear optical susceptibility $\chi^{(3)}$ due to optical excitation of electrons from the valence band into the conduction band in a semiconductor.

The third order nonlinear optical susceptibility $\chi^{(3)}$ is described by D.A.B. Mirror et al on pages 221 to 226 of "Optics Communication, vol. 35-2, 1980". In the reference, the third order nonlinear optical susceptibility $\chi^{(3)}$ is given by the formula (11), however, there is an obvious misprint therein. Therefore, the third order nonlinear optical susceptibility $\chi^{(3)}$ will be recalculated by the substantially same method as follows:

$$Re[\chi \ (\nu_s\nu_{p1} - \omega_{p1}\omega_s)] = -\frac{4e^4}{\pi^2 h^3 m_0^4} \frac{T_1}{T_2} \frac{p^4}{\omega_s^4} x \int dk \frac{k^2(\omega_s - \omega_s - hk^2/(2\mu))}{\left[\left(\omega_s - \nu_s - \frac{hk^2}{2\mu}\right)^2 + T_2^{-2}\right]\left[\left(\omega_p - \omega_s - \frac{hk^2}{2\mu}\right)^2 + T_2^{-2}\right]} \quad (1)$$

Where, e is a charge of an electron, $\pi = \pi/(2\pi)$, h is Plunck's constant, P is a dipole moment between the conduction and valence bands, $\omega_g = E_g/\pi$, $E_g$ is a band gap, $\mu$ is a reduced mass of electron and hole effective masses, and $T_1$ and $T_2$ are longitudinal and transverse relaxation times, respectively. The analysis is extended to cover the case in which a frequency $\omega_p$ of a pump light (control light) and a frequency $\omega_s$ of a signal light are different.

In the calculation shown above, only the real part of $\chi^{(3)}$ is calculated, because only the nonlinear refractive index change should be considered. The change of the refractive index n of the semiconductor is represented as follows:

$$n = n_0 + n_2 I \quad (2)$$

Where, $n_0$ is a linear refractive index, $n_2 I$ is a change portion of the refractive index by a light having an intensity I. The constant $n_2$ is called as the nonlinear refractive index and has a relation with $\chi^{(3)}$ as shown below (in cgs unit system):

$$n_2 = \frac{4\chi^2}{n^2 c} Re[\chi^{(3)}] \quad (3)$$

The nonlinear refractive index change caused by excitation of electrons from the valence band into the conduction band in a semiconductor will be explained as follows.

When a light having a frequency higher than an energy of the band gap is irradiated into a semiconductor, a large number of electrons in the valence band are excited into the conduction band due to the light absorption in the semiconductor. However, the excitation of electrons from the valence band into the conduction band becomes difficult as the conduction band becomes filled with the electrons excited from the valence band (band filling effects).

The refractive index of the semiconductor is affected by the band filling effects, because the refractive index is dependent on the real component of the optical nonlinearity $\chi^{(3)}$, and the optical nonlinearity $\chi^{(3)}$ is affected by the band filling effects.

The transition time of electrons from the valence band into the conduction band due to the light absorption is as short as some 100 fs, so that the nonlinear refractive index is thought to appear almost the same time as the light is supplied to the semiconductor.

According to the conventional nonlinear optical device for controlling a signal light by a control light, however, there is a disadvantage in that the operation speed of the nonlinear optical device is limited, because changes of the nonlinear refractive index can not follow changes of the control light. In more detailed description, the carriers excited in the semiconductor do not disappear quickly after stopping of the control light supply. This phenomenon is represented by $T_1$ (the longitudinal relaxation time or the re-combination time) in the formula (1). The longitudinal relaxation time $T_1$ is equal to or over 10 ns, so that the optical nonlinearity $\chi^{(3)}$ cannot follow the change of the control light in frequencies higher than 0.1 GHz. The relaxation time is equal to or over $10^{-9}$ s even in a direct transition type semiconductor such as GaAs. This is not enough for applying to a very high speed operation.

Furthermore, the optical nonlinearity $\chi^{(3)}$ has a tendency to become small as the relaxation time becomes short, so that the performance of the nonlinear optical device may become poor, in other words, it takes more power for the control operation.

Generally, a nonlinear material which has a large optical nonlinearity $\chi^{(3)}$ has a large relaxation time. Considering one semiconductor material, the optical nonlinearity $\chi^{(3)}$ is generally large in the phenomenon of the refractive index change, and the relaxation time is also large. The detailed description about the phenomenon is shown by R. A. Fishered in "Optical Phase Conjugation, chapter 10, 1983".

Consequently, it is difficult to obtain a nonlinear optical device which operates at a high operation speed and a low control power.

SUMMARY OF THE INVENTION

Accordingly, it is an object of the invention to provide a nonlinear optical device for controlling a signal light by a control light which operates at a high operation speed and a low control power.

According to a feature of the invention, a nonlinear optical device for controlling a signal light by a control light comprises:

a waveguide region consisting of an optical nonlinear semiconductor material having a third order optical nonlinearity ($\chi^{(3)}$); and means for applying an electrostatic field to said waveguide region.

BRIEF DESCRIPTION OF THE DRAWINGS

The invention will be explained in more detail in conjunction with appended drawings wherein.

DESCRIPTION OF THE PREFERRED EMBODIMENTS

Figure 1:
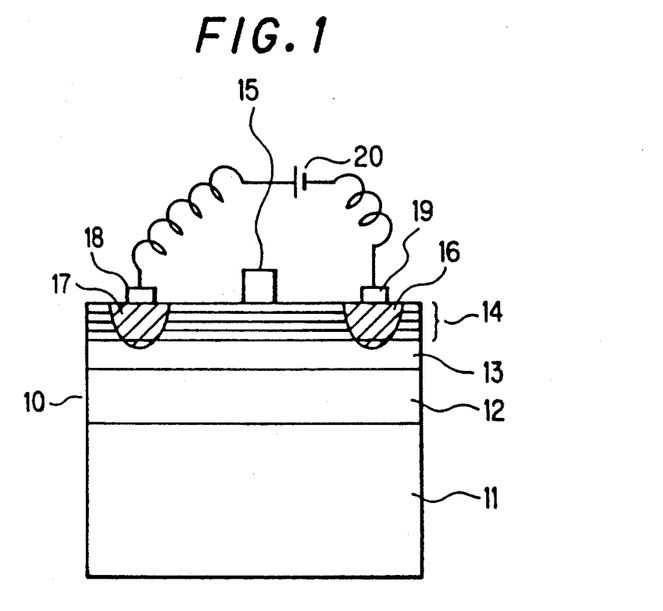
FIG. 1 is a cross-sectional view illustrating a nonlinear optical device for controlling a signal light by a control light in a first preferred embodiment according to the invention.

FIG. 1 is a cross-sectional view illustrating a nonlinear optical device 10 for controlling a signal light by a control light in a first preferred embodiment according to the invention.

The nonlinear optical element 10 comprises an $Al_{0.2}Ga_{0.8}As$ buffer layer 12 having a thickness of $3\mu$ m formed on a GaAs substrate 11, an AlAs clad layer 13 having a thickness of 2 $\mu$m formed on the buffer layer 12, a GaAs-AlAs multiple-quantum-well (MQW) layer 14 having a thickness of 0.5 $\mu$m formed on the clad layer 13, and an $Al_{0.2}Ga_{0.8}$ As ridge layer 15 having a thickness of 0.5 $\mu$m formed on the MQW layer 14. These layers are grown by the molecular beam epitaxy (MBE) method. The MQW layer 14 consists of 25 periods of alternate GaAs and AlAs layers having a thickness of 100 Å, respectively. The ridge layer 15 is etched to have a width of 0.5 $\mu$m. In the MQW layer 14, $n^+$-regions 16 and 17 are formed by diffusing Si. Au electrodes 18 and 19 are formed by evaporation to be connected electrically with the $n^+$-regions 16 and 17, respectively. A direct current (DC) supply 20 is connected with the Au electrodes 18 and 19.

The ridge layer 15 and a portion of the MQW layer 14 in the vicinity of the ridge layer 15 compose a waveguide of the nonlinear optical device 10. Both end surfaces of the ridge and MQW layers 14 and 15 which are input and output end surfaces of the nonlinear optical device 10 are respectively coated with anti-reflection layers.

In operation, when a light (control light) is supplied to the waveguide of the nonlinear optical device 10, the light is confined within the waveguide. The confinement of the light in the vertical direction is caused by differences of values of the refractive index between the MQW layer 14 and the clad layer 13, which are approximately 3.1 and 2.85, respectively. The confinement in the lateral direction is caused by the high refractive index of the ridge layer 15, which is approximately 3.22, so that the light is confined in the ridge layer 15 and a portion of the MQW layer 14 in the vicinity of the ridge layer 15. The extension of the light in the lateral direction within the MQW layer 14 is approximately 1 $\mu$m.

Since the ridge 15 has a cross-section of 0.5 $\mu$m $\times$ 0.5 $\mu$m and the MQW layer 14 has a thickness of 0.5 $\mu$m as mentioned above, the light power is divided into 50% each, one for the ridge layer 15 and the other for the MQW layer 14.

The band gaps of the ridge layer 15, the MQW layer 14 and the clad layer 13 are approximately 1.73 eV, 1.53 eV and 2.7 eV, respectively. Therefore, the light absorption coefficient relative to a signal light to be controlled having a wavelength of 1.55 $\mu$m is negligible in all the layers. As for the control light having a wavelength of 0.81 $\mu$m, only the MQW layer 14 has an intensive absorbing characteristic relative to the light, however, the absorptions is also negligible in the other layers.

The absorption of the control light in the MQW layer 14 is particularly large, because the wavelength of 0.81 $\mu$m corresponds to the exciton wavelength of the MQW layer 14.

In the formula (1), it is supposed that $e = 4.8 \times 10^{10}$ esu, $c = 3 \times 10^{10}$ cm/s, $h = 1.054 \times 10^{-27}$ erg.sec, $m_0 = 0.99 \times 10^{-27}$ g, $m_0 = 0.62$ $m_0$, $m_{hh} = 0.62$ $m_0$, $\mu = (m_e m_{hh})/(m_e + m_{hh})$, $P^2 = 1.33 \times m_0 \times E_g \times 3.0$ (the factor "3.0" is a correction factor of the exciton absorption in the MQW structure relative to the bulk value of $P^2$, which means that the value of $P^2$ becomes approximately three times of the bulk value), $\lambda_s = 1.55$ μm, $\lambda_p = 0.8$ μm, $T_1 = 100$ ps, and $T_2 = 1$ ps. As a result, $Re[\chi^{(3)}]$ becomes approximately $4 \times 10^{-6}$. On such a condition, the absorption coefficient α becomes approximately 5000 cm$^{-1}$. Where, the reason of applying 100 ps to $T_1$ is that the DC supply 20 supplying a voltage of 1 v is connected between the Au electrodes 18 and 19. The distance between the two electrodes 18 and 19 is approximately 10 μm, so that a field having an intensity of 1 kV/cm is kept being applied in the lateral direction in the MQW layer 14. As a result, carriers generated in the waveguide of the nonlinear optical device 10 by the control light having a wavelength of 0.81 μm are swept away from the waveguide by the field, so that the longitudinal relaxation time $T_1$ is effectively shortened down to 100 ps. Therefore, the operation speed of the nonlinear optical element 10 becomes 10 GHz. If the field is not applied, the maximum operation speed of the nonlinear optical element 10 may be equal to or under 0.1 GHz, as the original value $T_1$ of GaAs type material is equal to or over 10 ns.

The reason why the operation speed of the nonlinear optical device 10 increases by sweeping the carriers away from the MQW layer 14 will be explained.

The optical nonlinearity occurs only in a (spatial) portion where carriers are generated in the MQW layer 14. The speed of the nonlinearity depends on the recombination time of the carriers. Therefore, the nonlinearity disappears within the sweeping time of the carriers if the carriers are swept away from the waveguide. Means for sweeping the carriers away may be an electric field by applying a DC supply, however, a magnetic field may be also used.

In an undoped pure GaAs, the drift speed of electrons may be over $10^7$ cm/s even in the room temperature, when the field intensity is a few KV/cm. If the width of the waveguide is approximately 1 μm, the time for sweeping the electrons away is approximately 10 ps. The operation speed of the nonlinear optical element 10 becomes approximately 100 GHz.

In the nonlinear optical device 10, the waveguide comprises the MQW layer, so that a wave function of an electron has two-dimensional distribution, as compared with a non MQW structure in which the wave function has three-dimensional distribution. As a result, the mode number of electrons is largely reduced, so that a scattering probability of electrons becomes very small. Therefore, the mobility and drifting speed of electrons increase largely. These are described, for example, in "Physics and Application of Semiconductor Superlattice, chapter 10". The MQW structure may be replaced by a quantum well structure or a quantum wire structure.

It should be noted that there is a large anisotropy in mobility of carriers in the MQW structure, the quantum well structure or the quantum wire structure, so that the drift speed of carriers increases in the direction parallel to the laminated layers or axial direction of the structure, however, the drifting speed may not increase in the vertical direction.

In the MQW structure, excitons are generated in the room temperature, so that a large dipole moment due to the existence of excitons may be obtained. The optical nonlinearity $\chi^{(3)}$ is proportional to a number obtained by raising the dipole moment P to fourth power, as is clear by the formula (1), so that the optical nonlinearity $\chi^{(3)}$ becomes a multiplied number by $10^4$ if the dipole moment P becomes a multiplied number by 10. Consequently, the required power of the control light for operation of the nonlinear optical device 10 is $1/10^4$ of the power required in a nonlinear optical device not using the MQW structure at the same operation speed. If the operation speed becomes $10^4$ times larger, the required power becomes only $10^2$ times larger.

Figure 2:
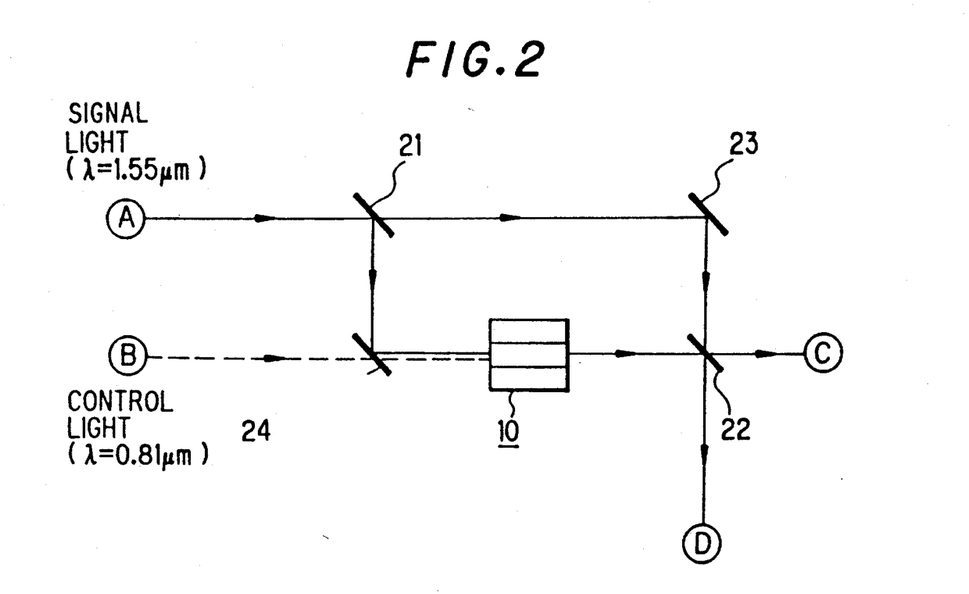
FIG. 2 is an explanatory view illustrating an optical modulator system using the nonlinear optical device in the first preferred embodiment according to the invention.

FIG. 2 is an explanatory view illustrating an optical modulator system using the nonlinear optical device 10.

A signal light having a wavelength of 1.55 μm to be controlled is supplied through a port A. The signal light is divided into two components at a beamsplitter 21. The first component of the signal light reaches a beamsplitter 22 through a mirror 23. The second component of the signal light reflects at a dielectric multilayer coating mirror 24, and then is supplied to a waveguide of a nonlinear optical device 10. On the other hand, a control light (pump light) having a wavelength of 0.81 μm for controlling the signal light is supplied through a port B. The control light is supplied to the waveguide of the nonlinear optical element 10 through the dielectric multilayer coating mirror 24, where no component of the control light reflects, because the reflectivity of the dielectric multilayer coating mirror 24 at a wavelength of 0.81 μm is "0". As a result, the refractive index of the waveguide of the nonlinear optical device 10 changes, so that the second component of the signal light experiences a phase shift. Then, the first and second components of the signal light join at the beamsplitter 22 to produce a combined component of the signal light. The combined component has a relative phase difference due to the phase shift of the second component, so that the combined component of the signal light is supplied either to a port C or to a port D in accordance to the relative phase difference thereof.

In this optical modulator system, the phase shift of the second component of the signal light in the nonlinear optical device 10 should be π radian in response to a presence of the control light. The relative phase shift Δϕ is given by the following formula:

$$\Delta\phi = \frac{2\pi}{\alpha_p \lambda_s} \frac{960\chi^2}{n^2 c} \chi^{(3)} I_p \quad (4)$$

Where, $\alpha_p$ is an absorption coefficient of the pump light (control light), $\lambda_s$ is a wavelength of the signal light, n is the refractive index (approximately 3.0), $c = 3 \times 10^{10}$ cm/s, and $I_p$ is an intensity of the pump light (W/m$^2$). In such a condition, the intensity $I_p = 3.2 \times 10^{10}$ W/m$^2$, if $\Delta\phi = \pi$. A mode area of the waveguide of the nonlinear optical device 10 is approximately 1 μm × 1 μm, so that the control power for operation of the optical modulator system is approximately 32 mW.

In the calculation shown above, it is assumed that the semiconductor composing the waveguide is at a weak absorption saturation state, so that the value of the control power thus obtained is a larger estimate. This estimate works well in a wavelength region where the light absorption coefficient is not so large. However, the control power tends to become large to include a large loss in the exciton wavelength region, where the light absorption coefficient is very large, because the large absorption saturation effects in the MQW structure can be obtained at the exciton wavelength region by a control power equal to or lower than one tenth of that in the bulk structure. Therefore, the optical nonlinearity $\chi^{(3)}$ becomes far large as compared with the value obtained by the formula (4), and the light absorption coefficient saturates at a relatively low control power. Consequently, $\alpha_P$ in the formula (4) becomes effectively small.

As a result, the optical modulator system operates at 10 GHz by approximately 1 mW. Therefore, it is possible to increase the operation speed of the optical modulator system by increasing a voltage of the DC supply to increase the drifting speed of electrons without a large increase of the control power.

Figure 3:
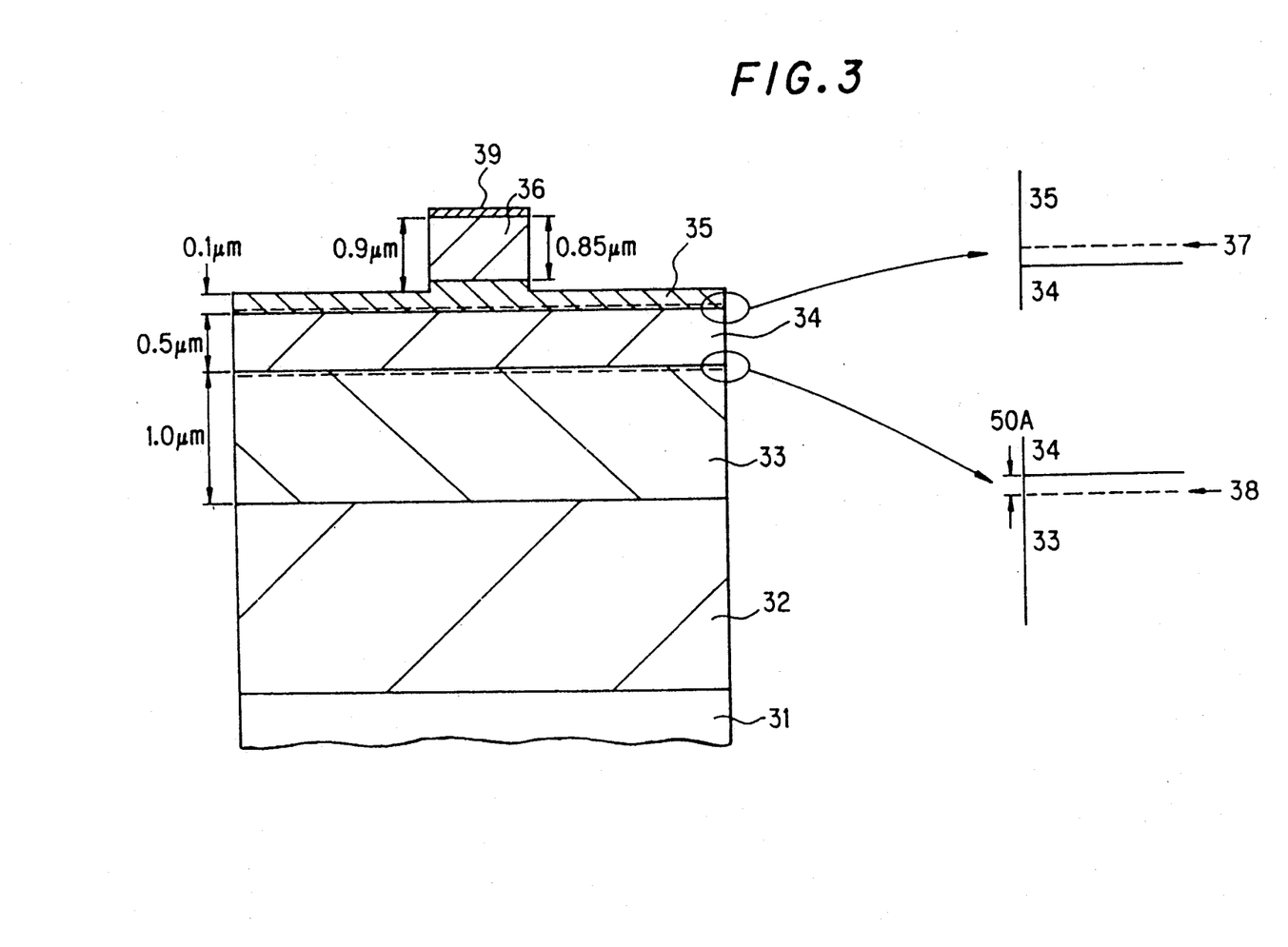
FIG. 3 is a cross-sectional view illustrating a nonlinear optical device for controlling a signal light by a control light in a second preferred embodiment according to the invention.

FIG. 3 is a cross-sectional view illustrating a nonlinear optical device for controlling a signal light by a control light in a second preferred embodiment according to the invention.

The nonlinear optical device comprises an n-AlGaAs layer 32 ($N_d \approx 10^{17}$/cc, composition ratio of Ga $\times$ =0.4) having a thickness of 4 μm formed on an n+-GaAs substrate 31 ($N_d \approx 10^{17}$/cc), an i-AlGaAs clad layer 33 ($\times \approx 0.4$) having a thickness of 1.0 μm formed on the n-AlGaAs layer 32, an i-GaAs waveguide layer 34 having a thickness of 0.5 μm formed on the i-AlGaAs clad layer 33, an i-AlGaAs clad layer 35 ($\times \approx 0.5$) having a thickness of 0.15 μm formed on the i-GaAs waveguide layer 34, and a p-AlGaAs ridge layer 36 (Na $\approx 10^{17}$/cc, $\times$ =0.4) having a thickness of 0.85 μm. These layers are grown by the MBE method. The p-AlGaAs ridge layer 36 is etched to have a predetermined width. A p-delta doping layer 37 ($10^{14}$/cm²) is formed within the i-AlGaAs clad layer 35 at an area distant by 50 Å from the hetero junction interface between the i-AlGaAs clad layer 35 and the i-GaAs waveguide layer 34. Meanwhile, an n-delta doping layer 38 ($10^{14}$/cm²) is formed within the i-AlGaAs clad layer 33 at an area distant by 50 Å from the hetero junction interface between the i-AlGaAs clad layer 33 and the i-GaAs waveguide layer 34. The waveguide mode is formed at a portion of the i-GaAs waveguide layer 34 in the vicinity of the p-AlGaAs ridge layer 36. Additionally, an electrode 39 is formed on the top surface of the p-AlGaAs ridge layer 36.

In the nonlinear optical element, the i-GaAs waveguide layer 34 which is an undoped optical nonlinear semiconductor is sandwiched between the p-type and n-type delta doping layers 37 and 38 to form a p-i-n structure.

In such a structure, when a reverse bias is applied to the optical element, a high electric field is generated in the waveguide layer 34, so that carriers relating to changes of the nonlinear refractive index of the waveguide layer 34 are swept away therefrom.

In more detailed description, the difference of the refractive index between the AlGaAs and GaAs layers reaches approximately 5%, while the change of the refractive index by the delta doping can be negligible (up to 1%). Therefore, such a delta doping layer little affects the characteristic of the waveguide. As a result, a high confinement coefficient Γ approximately 0.6 which is a property of the hetero structure can be obtained.

Figure 4A:
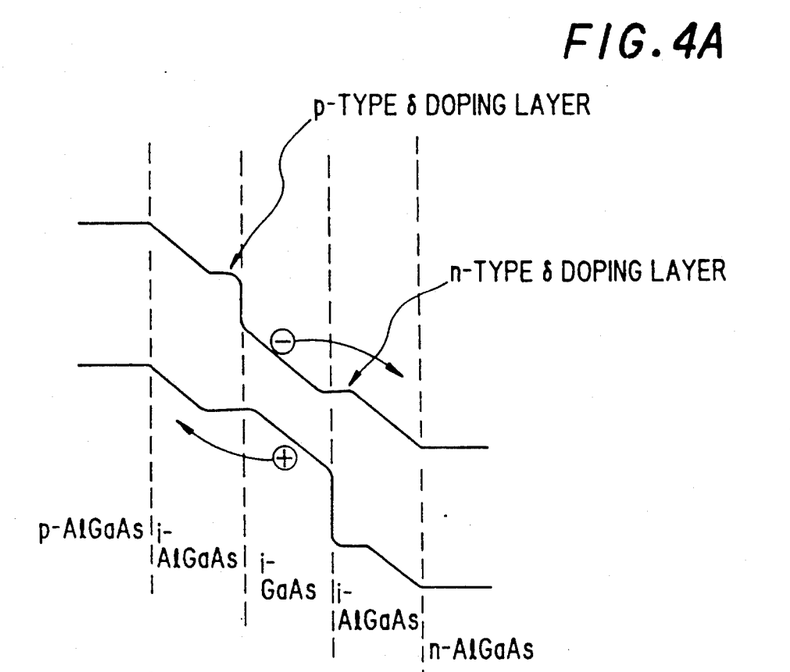
FIGS. 4A and 4B are simplified models respectively illustrating the band energy in a waveguide of the nonlinear optical device for controlling a signal light by a control light in the second preferred embodiment and in a hetero structure without delta doping layers for comparison, respectively.
Figure 4B:
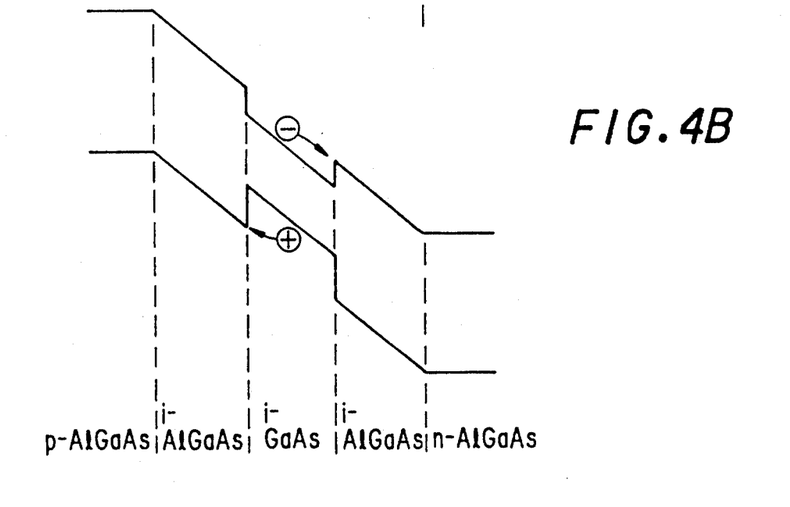

FIGS. 4A and 4B are simiplified models respectively illustrating the band energy in the second preferred embodiment and a hetero structure without delta doping for comparison, respectively. When a reverse bias is applied to the waveguide layer 34, electrons and holes generated by the control light supplied to the waveguide layer 34 drift within the waveguide layer 34. However, if there is no delta doping layer at the hetero junction interface between the i-AlGaAs as i-GaAs as in FIG. 4B, the carriers are piled up at the hetero junction interface due to the band discontinuity thereof. Although carriers which are accelerated by a high field pass through the band discontinuity, some number of carriers are trapped at the hetero junction interface, so that the change of the nonlinear refractive index persists.

On the other hand, in this embodiment as shown in FIG. 4A, the band discontinuity at the hetero junction interface is removed by providing p-type and n-type delta doping layers. Most of the electrons and holes generated by the control light are swept away from the waveguide quickly, so that the nonlinear refractive index changes in response to the control light. As a result the operation speed of the optical control device increases.

The delta doping layer may be replaced by any doping layer as far as it reduces the band discontinuity. For example, a triangle doping layer, a gauss type doping layer, or a more extended uniform doping layer may be adopted. Additionally, the number of band discontinuity is not limited to two like the preferred embodiments.

In the preferred embodiments, the GaAs material systems are used for composing the optical element, however, other material systems such as InGaAsP or InGaAs material systems may be adopted.

Although the invention has been described with respect to specific embodiment for complete and clear disclosure, the appended claims are not to thus limit and alternative constructions will occur to one skilled in the art which fairly fall within the basic teaching herein set forth.

What is claimed is:

1. A nonlinear optical device for controlling a signal light by a control light, comprising:
   a waveguide region consisting of an optical nonlinear semiconductor material having a third order nonlinear optical constant ($X^{(3)}$); and
   means for applying an electrostatic field to said waveguide region.

2. A nonlinear optical device for controlling a signal light by a control light, according to claim 1, wherein:
   said waveguide region comprising a structure selected from a group consisting of a quantum well structure, a multiple quantum well structure and a quantum well wire structure; and
   said applying means applies said electrostatic field in a direction parallel to laminated layers in case of said quantum well structure and multiple quantum well structure and in a direction parallel to an axis of said quantum well wires in case of said quantum well wire structure.

3. A nonlinear optical device for controlling a signal light by a control light, according to claim 1, wherein:
   said waveguide region includes a ridge layer having a high refractive index.

4. A nonlinear optical device for controlling a signal light by a control light, according to claim 1, wherein:
   said waveguide region includes a pair of n+-regions to which said applying means are connected.

5. A nonlinear optical device for controlling a signal light by a control light, according to claim 1, further comprising:
   a clad layer having a refractive index smaller than that of said waveguide region below said waveguide region.

6. A nonlinear optical device for controlling a signal light by a control light, comprising:
   a first semiconductor layer having a nonlinear refractive index with a narrow band gap;
   second and third semiconductor layers both having a band gap wider than that of said first semiconductor layer, said second and third semiconductor layers sandwiching said first semiconductor layer to compose a three-layer hetero structure having a pair of hetero junction interfaces; said second semiconductor layer including an n-type high impurity-doped layer in the vicinity of said hetero junction interface with said first semiconductor layer, and said third semiconductor layer including a p-type high impurity-doped layer in the vicinity of said hetero junction interface with said first semiconductor layer
   means for applying a reverse bias to said first semiconductor layer to generate an electric field therein, so that carriers generated by the control light are swept away from said first semiconductor layer causing a change of the nonlinear refractive index of said first semiconductor layer thereby increasing an operation speed of the nonlinear optical device.

7. A nonlinear optical device for controlling a signal light by a control light, according to claim 6, wherein:
   each of said n-type and p-type highly impurity doped layers is a layer selected from a group consisting of a delta doping layer, a triangle doping layer and a gauss doping layer.

* * * * *

UNITED STATES PATENT AND TRADEMARK OFFICE
CERTIFICATE OF CORRECTION

PATENT NO. : 5,191,630

DATED : March 2, 1993

INVENTOR(S) : Kazuhito TAJIMA et al.

It is certified that error appears in the above-identified patent and that said Letters Patent is hereby corrected as shown below:

Col. 2, lines 13-19, delete in their entirety and insert therefor $$Re[\chi^{(3)}(\omega s; \omega_p, -\omega_p, \omega_s)]$$

$$= \frac{4e^4}{\pi^2 \hbar^3 M_o^4} \frac{T_1}{T_2} \frac{p^4}{\omega_g^4}$$

$$\times \int dk \frac{k^2(\omega_s - \omega_g - \hbar k^2/(2\mu))}{[(\omega_s - \omega_g - \frac{\hbar k^2}{2\mu})^2 + T_2^{-2}][(\omega_p - \omega_g - \frac{\hbar k^2}{2\mu})^2 + T_2^{-2}]}$$

line 20, after "electron," delete "$\pi=\pi/(2\pi)$" and insert --$\hbar=h/(2\pi)$--;

line 22, change "$\omega g=Eg/\pi$" to --$\omega g=Eg/\hbar$--.

lines 42-44, delete in their entirety and insert therefor $$n_2 = \frac{4\pi^2}{n^2 c} Re[\chi^{(3)}] \qquad (3)$$

Col. 4, line 11, delete "$3\mu$ m" and insert --$3\mu$m--.

(Continued)

UNITED STATES PATENT AND TRADEMARK OFFICE
CERTIFICATE OF CORRECTION

PATENT NO. : 5,191,630
DATED : March 2, 1993
INVENTOR(S) : Kazuhito Tajima, et al It is certified that error appears in the above-indentified patent and that said Letters Patent is hereby corrected as shown below:

Col. 5, line 1, change "$m_o = 0.62$" to --$m_e = 0.62$--;

line 2, change "$(m_e m_{hh})$" to --$(m_e\ m_{hh})$--.

Col. 6, lines 46-48, delete in their entirety and insert therefor $$-- \Delta\varnothing = \frac{2\pi}{\alpha_p \lambda_s} \frac{960\pi^2}{n^2 c} \chi^{(3)} Ip \qquad (4) --$$

Signed and Sealed this

Twelfth Day of April, 1994

Attest:

BRUCE LEHMAN

Attesting Officer

Commissioner of Patents and Trademarks